United States Patent
Lassila et al.

(10) Patent No.: US 6,190,733 B1
(45) Date of Patent: Feb. 20, 2001

(54) ALKYLATED AMINOETHER SURFACTANTS

(75) Inventors: Kevin Rodney Lassila, Macungie; Kristen Elaine Minnich; Richard Van Court Carr, both of Allentown, all of PA (US)

(73) Assignee: Air Products and Chemicals, Inc., Allentown, PA (US)

(*) Notice: Under 35 U.S.C. 154(b), the term of this patent shall be extended for 0 days.

(21) Appl. No.: 09/327,068

(22) Filed: Jun. 7, 1999

Related U.S. Application Data

(62) Division of application No. 09/045,471, filed on Mar. 20, 1998, now Pat. No. 6,051,056.

(51) Int. Cl.⁷ ........................................ B05D 5/00
(52) U.S. Cl. .................. 427/256; 427/445; 106/31.28; 514/975; 514/668; 514/670
(58) Field of Search .................. 427/256, 445; 106/31.28; 504/326; 514/668, 670, 975; 516/203; 510/499

(56) References Cited

U.S. PATENT DOCUMENTS

| | | | |
|---|---|---|---|
| 4,927,912 | 5/1990 | Speranza et al. | 528/405 |
| 4,946,924 * | 8/1990 | Speranza et al. | 528/111 |

FOREIGN PATENT DOCUMENTS 2191419  12/1987  (GB).

OTHER PUBLICATIONS

Schwartz, J. "The Importance of Low Dynamic Surface Tension in Waterborne Coatings" Journal of Coatings Technology, Sep. 1992.

Wirth, W., Storp, S., Jacobsen, W., "Mechanisms Controlling Leaf Retention of Agricultural Spray Solutions" Pestic. Sci. 1991, 33, 411–420.

Medina, S. W., Sutovich, M. N. "Using Surfactants to Formulate VOC Compliant Waterbased Inks" Am. Ink Maker 1994, 72 (2), 32–38.

Gatto, et al. J. Org. Chem. 1986, 51, 5373–5383.

Tetrahedron Letters 1986, 27, 327–330.

Anelli, et al. J. Chem Soc., Chem Commun. 1983, 194–195; J. Org. Chem 1984, 49–4194–4203.

Bradshaw, Krakowiak, et al. J. Org. Chem 1989, 54, 4061–4067.

Tehedron Letters 1988, 29, 3521–3524.

H. Heterocyclic Chem 1989, 26, 565–569.

Petranek and Ryba, Tetrahedron Letters 1977, 48–4249–4250.

Bradshaw, et al. Tetrahedron 1990, 46, 1163–1170.

Duriez, et al. Tetrahedron 1992, 4347–4358.

Hosgoren, et al., Collect. Czech. Chem Commun. 1996, 61, 622–626.

Acta Pol. Pharm. 1987, 44,473–475.

Acta Pol. Pharm. 1983, 40, 431–434.

Acta Pol. Pharm. 1983, 40, 313–318.

* cited by examiner

*Primary Examiner*—James J. Seidleck
*Assistant Examiner*—U. K. Rajguru
(74) *Attorney, Agent, or Firm*—Michael Leach

(57) ABSTRACT

This invention provides water-based compositions, particularly coating, ink, and agricultural compositions, manifesting reduced equilibrium and dynamic surface tension by the incorporation of a surface tension reducing amount of certain alkylated aminoether compounds of the structure $$R-HN(CH_2)_p[O(CH_2)_n]_mO(CH_2)_qNH-R'$$

where n is 2–6, m is 0–4, and p and q are 2–6, and R and R' independently are an alkyl group comprising 5 to 18 carbons, preferably which is branched or in which the point of attachment to nitrogen is on a nonterminal carbon.

9 Claims, No Drawings

ALKYLATED AMINOETHER SURFACTANTS

This application is a divisional of Ser. No. 09/045,471 Mar. 20, 1998, U.S. Pat. No. 6,051,056.

FIELD OF THE INVENTION

The invention relates to the use of alkylated aminoethers to reduce the surface tension in water-based systems.

BACKGROUND OF THE INVENTION

The ability to reduce the surface tension of water is of great importance in waterborne coatings, inks, adhesives, and agricultural formulations because decreased surface tension translates to enhanced substrate wetting in actual formulations. Surface tension reduction in water-based systems is generally achieved through the addition of surfactants. Performance attributes resulting from the addition of surfactants include enhanced surface coverage, fewer defects, and more uniform distribution. Equilibrium surface tension performance is important when the system is at rest. However, the ability to reduce surface tension under dynamic conditions is of great importance in applications where high surface creation rates are utilized. Such applications include spraying, rolling and brushing of coatings or spraying of agricultural formulations, or high speed gravure or ink-jet printing. Dynamic surface tension is a fundamental quantity which provides a measure of the ability of a surfactant to reduce surface tension and provide wetting under such high speed application conditions.

Traditional nonionic surfactants such as alkylphenol or alcohol ethoxylates, and ethylene oxide (EO)/propylene oxide (PO) copolymers have excellent equilibrium surface tension performance but are generally characterized as having poor dynamic surface tension reduction. In contrast, certain anionic surfactants such as sodium dialkyl sulfosuccinates can provide good dynamic results, but these are very foamy and impart water sensitivity to the finished coating.

There is a need for a family of surfactants which provide good equilibrium and dynamic surface tension properties, are low-foaming, are liquids at room temperature to facilitate handling and are stable under basic conditions and thus would be widely accepted in the coating, ink, adhesive, and agricultural formulation industries.

The importance of reducing equilibrium and dynamic surface tension in applications such as coatings, inks, and agricultural formulations is well-appreciated in the art.

Low dynamic surface tension is of great importance in the application of waterborne coatings. In an article, Schwartz, J. "The Importance of Low Dynamic Surface Tension in Waterborne Coatings", Journal of Coatings Technology, September 1992, there is a discussion of surface tension properties in waterborne coatings and a discussion of dynamic surface tension in such coatings. Equilibrium and dynamic surface tension were evaluated for several surface active agents. It is pointed out that low dynamic surface tension is an important factor in achieving superior film formation in waterborne coatings. Dynamic coating application methods require surfactants with low dynamic surface tensions in order to prevent defects such as retraction, craters, and foam.

Efficient application of agricultural products is also highly dependent on the dynamic surface tension properties of the formulation. In an article, Wirth, W.; Storp, S.; Jacobsen, W. "Mechanisms Controlling Leaf Retention of Agricultural Spray Solutions"; Pestic. Sci. 1991, 33, 411–420, the relationship between the dynamic surface tension of agricultural formulations and the ability of these formulations to be retained on a leaf was studied. These workers observed a good correlation between retention values and dynamic surface tension, with more effective retention of formulations exhibiting low dynamic surface tension.

Low dynamic surface tension is also important in high-speed printing as discussed in the article "Using Surfactants to Formulate VOC Compliant Waterbased Inks", Medina, S. W.; Sutovich, M. N. Am. Ink Maker 1994, 72 (2), 32–38. In this article, it is stated that equilibrium surface tensions (EST's) are pertinent only to ink systems at rest. EST values, however, are not good indicators of performance in the dynamic, high speed printing environment under which the ink is used. Dynamic surface tension is a more appropriate property. This dynamic measurement is an indicator of the ability of the surfactant to migrate to a newly created ink/substrate interface to provide wetting during high speed printing.

U.S. Pat. No. 5,098,478 discloses water-based ink compositions comprising water, a pigment, a nonionic surfactant and a solubilizing agent for the nonionic surfactant. Dynamic surface tension in ink compositions for publication gravure printing must be reduced to a level of about 25 to 40 dynes/cm to assure that printability problems will not be encountered.

U.S. Pat. No. 5,562,762 discloses an aqueous jet ink of water, dissolved dyes and a tertiary amine having two polyethoxylate substituents and that low dynamic surface tension is important in ink jet printing.

Gatto, et al., *J. Org. Chem.* 1986, 51, 5373–5383; *Tetrahedron Letters* 1986, 27, 327–330, describe several alkylated aminoethers of the form

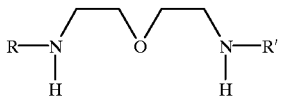

in which R=R'=CH$_2$CH$_2$OCH$_3$, CH$_2$Ph, CH$_2$C$_6$H$_4$-2-OCH$_3$, and CH$_2$-2-furanyl. These compounds were used as intermediates for the synthesis of bibracchial lariat ethers.

Also described in the foregoing paper are compounds of the form

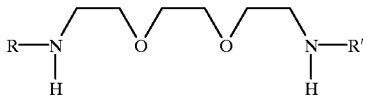

where R=R'=(CH$_2$)$_3$CH$_3$, (CH$_2$)$_5$CH$_3$, CH$_2$CH$_2$OCH$_3$, CH$_2$Ph, and CH$_2$-2-furanyl. These compounds were also used as intermediates for the synthesis of bibracchial lariat ethers.

Anelli and coworkers, *J. Chem. Soc., Chem. Commun.* 1983,194–195; *J. Org. Chem.* 1984, 49, 4197–4203, describe alkylated aminoethers of the form

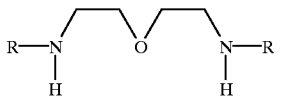

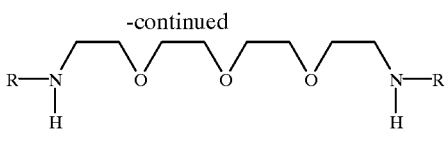

where R=(CH$_2$)$_3$CH$_3$. Also described by these workers are alkylated aminoethers of the form

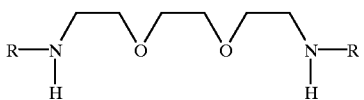

where R=(CH$_2$)$_3$CH$_3$ or R=(CH$_2$)$_7$CH$_3$. These materials were used for the preparation of double and triple bridged polyoxapolyazaheterophanes.

Bradshaw, Krakowiak and coworkers, *J. Org. Chem.* 1989, 54, 4061–4067; *Tetrahedron Letters* 1988, 29, 3521–3524; and *J. Heterocyclic Chem.* 1989, 26, 565–569, also describe aminoethers of the form

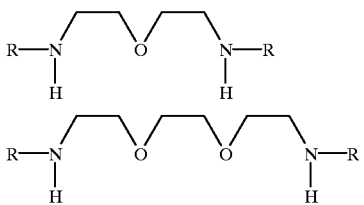

where R=(CH$_2$)$_3$CH$_3$ or CH$_2$Ph. The benzyl derivatives were also described by Petranek and Ryba, *Tetrahedron Letters* 1977, 48, 4249–4250. The compounds were used as intermediates in the synthesis of polyaza crown compounds or other macrocycles.

Bradshaw and coworkers, *Tetrahedron* 1990, 46, 1163–1170, describe an alkylated aminoether of the form

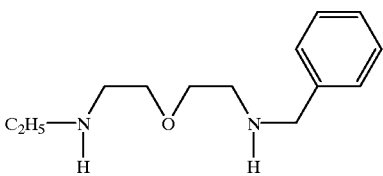

The N,N'-dibenzyl derivative is also described here and by Duriez, et al., *Tetrahedron* 1992, 4347–4358. They are used as intermediates for the preparation of lariat ethers or other macrocyclic materials.

Hosgoren, et al., *Collect. Czech. Chem. Commun.* 1996, 61, 622–626, describe compounds of the type

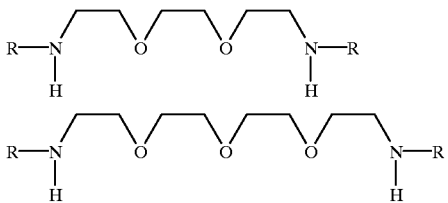

where R=CH$_3$(CH$_2$)$_6$, CH$_3$(CH$_2$)$_7$, CH$_3$(CH$_2$)$_8$, or CH$_3$(CH$_2$)$_{11}$. These compounds were used for the preparation of N,N'-dialkyldiaza crown compounds.

U.S. Pat. No. 4,946,924 and U.S. Pat. No. 4,927,912 disclose compositions of the form

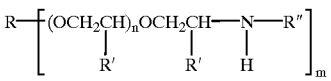

wherein R is the nucleus of an oxyalkylation-susceptible polyhydric alcohol containing 2 to 12 carbon atoms and 2 or 3 hydroxyl groups, and R' is hydrogen or methyl, at least one of R" is isopropyl and the remainder of R" is hydrogen or isopropyl, n is a number sufficient to impart a molecular weight of about 200 to 400 to the molecule, and m is a positive integer having a value of 2 or 3. These amines are useful as curing agents for epoxy resins.

GB 2,191,419 discloses a structure of the form

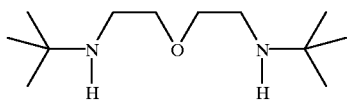

This material is reported to be useful in wash solutions for the selective removal of H$_2$S and other S-containing compounds (e.g. COS, CS$_2$, and mercaptans) from CO$_2$-containing gases, especially natural gas and synthesis gas.

The alkylated aminoether of the form

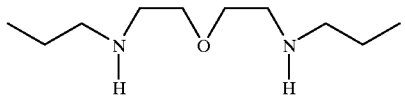

is reported in *Acta Pol. Pharm.* 1987, 44, 473–475, *Acta Pol. Pharm.* 1983, 40, 431–434, and *Acta Pol. Pharm.* 1983, 40, 313–318 where it is used as a synthetic intermediate.

SUMMARY OF THE INVENTION

This invention provides water-based compositions containing an organic compound, particularly organic coating, ink, and agricultural compositions, having reduced equilibrium and dynamic surface tension by incorporation of an effective amount of an alkylated aminoether compound of the following structure:

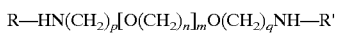

where n is 2–6, m is 0–4, and p and q are 2–6, and R and R' independently are an alkyl group comprising 5 to 18 carbons, preferably which is branched or in which the point of attachment to nitrogen is on a nonterminal carbon. Also provided is a method for lowering the equilibrium and dynamic surface tension of aqueous compositions by the incorporation of these alkylated aminoether compounds.

Also provided is a method for applying a water-based organic compound-containing composition to a surface to partially or fully coat the surface with the water-based composition, the composition containing an effective amount of an alkylated aminoether compound of the above structure for reducing the dynamic surface tension of the water-based composition.

There are significant advantages associated with the use of these alkylated aminoethers in water-based organic coatings, inks, and agricultural compositions and these advantages include:

an ability to formulate water-borne coatings, inks, and agricultural compositions which may be applied to a variety of substrates with excellent wetting of substrate surfaces including contaminated and low energy surfaces;

an ability to provide a reduction in coating or printing defects such as orange peel and flow/leveling deficiencies;

an ability to produce water-borne coatings and inks which have low volatile organic content, thus making these surfactants environmentally favorable;

an ability to formulate coating and ink compositions capable of high speed application;

an ability to formulate compositions which retain dynamic surface tension properties under strongly basic, high temperature environments.

an ability to formulate coatings, inks, and adhesives in which the surfactant is reactive during cure, reducing water sensitivity in the final products which arises from the presence of free surfactant.

Because of their excellent surfactant properties and low foam characteristics, these materials are likely to find use in many applications in which reduction in dynamic and equilibrium surface tension and low foam are important. Such applications include various wet-processing textile operations, such as dyeing of fibers, fiber souring, and kier boiling, where low-foaming properties would be particularly advantageous; they may also have applicability in soaps, water-based perfumes, shampoos, and various detergents where their marked ability to lower surface tension while simultaneously producing substantially no foam would be highly desirable.

DETAILED DESCRIPTION OF THE INVENTION

This invention relates to the use of compounds of the formula

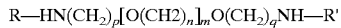

where n is 2–6, preferably 2–4; m is 0–4, preferably 0–2; and p and q are 2–6, preferably 2 or 3; and R and R' independently are an alkyl group comprising 5 to 18 carbons, preferably 5 to 8 carbons which is branched or in which the point of attachment to nitrogen is on a nonterminal carbon, for the reduction of equilibrium and dynamic surface tension in water-based compositions containing an organic compound, particularly coating, ink, and agricultural compositions containing organic compounds such as polymeric resins, herbicides, pesticides or plant growth modifying agents. It is desirable that an aqueous solution of the alkylated aminoether demonstrates a dynamic surface tension of less than 45 dynes/cm at a concentration of ≦5 wt % in water at 23° C. and 1 bubble/second according to the maximum-bubble-pressure method. The maximum-bubble-pressure method of measuring surface tension is described in *Langmuir* 1986, 2, 428–432, which is incorporated by reference.

The alkylated aminoethers can be prepared by reductive alkylation of the parent aminoethers with aldehydes and ketones using well-established procedures. The essential aspects of the preparation are the reaction of an aldehyde or ketone with the aminoether to make an imine or enamine intermediate which then reacts with hydrogen in the presence of a suitable hydrogenation catalyst to form the corresponding saturated derivative.

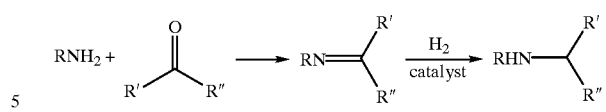

The imine or enamine derivative may be preformed or may be prepared in situ.

The products could also be prepared by reductive amination of a suitable dinitrile.

This reaction is illustrated for the cyanoethylated derivative of ethylene glycol:

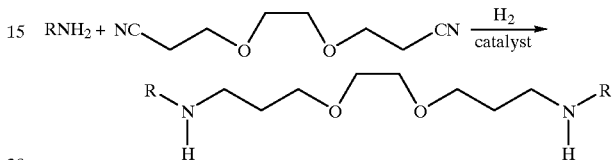

The reductive alkylation and reductive amination procedures are the methods of choice for the production of these materials, but the products may also be prepared by reaction of an amine with a chloralkylether. This reaction is illustrated for chloroethyl ether and an amine:

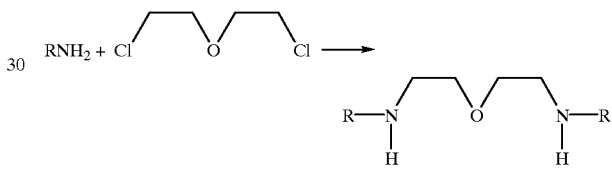

Aminoether starting materials which are suitable for use in the reductive alkylation reaction include compounds of the form

where n is 2–6, m is 0–4, and p and q are 2–6. Specific examples include aminoethyl ether; 1,2-bis-aminoethoxyethane; 2-aminoethoxyethyl ether; aminopropyl ether; 1,2-bis-aminopropoxyethane; 3-aminopropoxyethyl ether; and the like. The aminopropoxy compounds may be prepared by reaction of a diol with acrylonitrile, followed by hydrogenation:

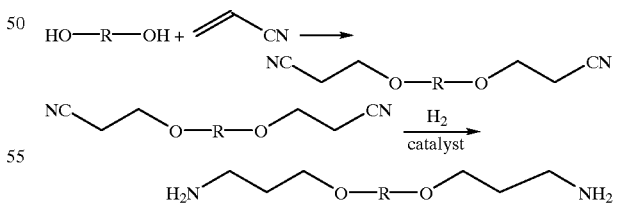

Suitable diols for use in the aminopropylation reaction include 1,2-ethanediol; 1,3-propanediol; 1,4-butanediol; 1,5-pentanediol, 1,6-hexanediol, and the like; diethylene glycol; triethyleneglycol; tetraethyleneglycol, and the like; dipropyleneglycol, tripropyleneglycol, and the like.

Alkyl groups which are suitable for use on the aminoethers should have sufficient carbon atoms to confer surface activity (i.e. an ability to reduce the surface tension of water) to the material but not enough carbon atoms to decrease the solubility to the extent that the ability of the material to reduce surface tension is insufficient for a particular application. In general, an increase in the carbon number increases the efficiency of the resulting alkylated aminoether surfactant (i.e., less surfactant is required to obtain a given decrease in surface tension) but decreases its ability to reduce surface tension at high surface creation rates (i.e., less effective for reducing dynamic surface tension). The latter effect is a result of the fact that increased carbon number generally decreases the water solubility of the material, and consequently, diminishes the diffusive flux of surfactant to newly-created surface. Generally, in the practice of this invention, it is desirable to use alkylated aminoethers having a solubility in water of at least 0.005 wt %, preferably from 0.01 to 2 wt %, and most preferably from 0.05 to 1.5 wt %.

The alkyl groups may be the same or different. They may be branched or the point of attachment to the nitrogen of the diamine may be on an internal carbon. Suitable alkyl groups are derived from reductive alkylation reactions of a C5 to C8 aldehyde or ketone, preferably derived from reductive alkylation reactions of methyl isobutyl ketone or methyl isoamyl ketone. Specific examples of suitable C5 to C8 aldehydes and ketones include 2-pentanone, 3-pentanone, pivaldehyde, methyl isopropyl ketone, 2-hexanone, 3-hexanone, methyl tert-butyl ketone, ethyl isopropyl ketone, 2-methylhexanal, 2-heptanone, 3-heptanone, 4-heptanone, 2-octanone, 3-octanone, 4-octanone, 2-ethylhexanal, and so on. The specific carbonyl compound and aminoether chosen will depend on the surfactant properties required for a particular application.

The alkylated aminoethers are suitable for use in an aqueous composition comprising in water an inorganic compound which is a mineral ore or a pigment or an organic compound which is a pigment, a polymerizable monomer, such as addition, condensation and vinyl monomers, an oligomeric resin, a polymeric resin, a detergent, a herbicide, a pesticide, or a plant growth modifying agent. An amount of the alkylated aminoether compound that is effective to reduce the equilibrium and/or dynamic surface tension of the water-based inorganic and/or organic compound-containing composition is added. Such effective amount may range from 0.001 to 20 g/100 ml, preferably 0.01 to 2 g/100 ml, of the aqueous composition. Naturally, the most effective amount will depend on the particular application and the solubility of the alkylated aminoether.

In the following water-based organic coating, ink, and agricultural compositions containing an alkylated aminoether according to the invention, the other listed components of such compositions are those materials well known to the workers in the relevant art.

A typical water-based organic coating composition to which the alkylated aminoether surfactants of the invention may be added would comprise the following components in an aqueous medium at 30 to 80% solids:

| Typical Water-Based Organic Coating Composition | |
|---|---|
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99.9 wt % | Water-Borne/Water-Dispersible/Water-Soluble Resins |
| 0 to 30 wt % | Slip Additives/Antimicrobials/Processing Aids/Defoamers |
| 0 to 50 wt % | Coalescing or Other Solvents |
| 0.01 to 10 wt % | Surfactant/Wetting Agent/Flow and Leveling Agents |
| 0.01 to 5 wt % | Alkylated Aminoether |

A typical water-based ink composition to which the alkylated aminoether surfactants of the invention may be added would comprise the following components in an aqueous medium at 20 to 60% solids:

| Typical Water-Based Ink Composition | |
|---|---|
| 1 to 50 wt % | Pigment |
| 0 to 50 wt % | Pigment Dispersant/Grind Resin |
| 0 to 50 wt % | Clay base in appropriate resin solution vehicle |
| 5 to 99.9 wt % | Water-Borne/Water-Dispersible/Water-Soluble Resins |
| 0 to 30 wt % | Coalescing Solvents |
| 0.01 to 10 wt % | Surfactant/Wetting Agent |
| 0.01 to 10 wt % | Processing Aids/Defoamers/Solubilizing Agents |
| 0.01 to 5 wt % | Alkylated Aminoether |

A typical water-based agricultural composition to which the alkylated aminoether surfactants of the invention may be added would comprise the following components in an aqueous medium at 0.1 to 80% ingredients:

| Typical Water-Based Agricultural Composition | |
|---|---|
| 0.1 to 50 wt % | Pesticide or Plant Growth Modifying Agent |
| 0.01 to 10 wt % | Surfactant |
| 0 to 5 wt % | Dyes |
| 0 to 20 wt % | Thickeners/Stabilizers/Co-surfactants/Gel Inhibitors/Defoamers |
| 0 to 25 wt % | Antifreeze |
| 0.1 to 50 wt % | Alkylated Aminoether |

EXAMPLE 1

This example illustrates the procedure for the preparation of the reductive alkylation product of aminoethylether and methyl isobutyl ketone (AEE/MIBK).

Aminoethyl ether (0.75 mole), methyl isobutyl ketone (1.65 mole) and 10% Pd/C (4 wt % of total charge) were charged to a one liter stainless steel autoclave. The reactor was sealed and purged with nitrogen then hydrogen. The contents of the reactor were heated to 90° C. under 3 bar (50 psig) $H_2$. The pressure was increased to 8 bar (120 psig) and maintained throughout the reaction (21.5 hours) by the admission of hydrogen from a 1 gallon ballast on demand by a dome regulator. The reactor contents were analyzed by GC/FID and found to be 92.8 area % dialkylated aminoethylether:

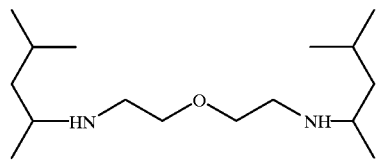

The product was purified by distillation at 116–118° C., 0.20 millibar (0.15 Torr).

EXAMPLE 2

This example illustrates the procedure for the preparation of the reductive alkylation product of aminopropylether and methyl isobutyl ketone (APE/MIBK).

The aminopropyl ether required for the reductive alkylation reaction was prepared by hydrogenation of cyanoethyl ether. Nickel-chromium promoted sponge cobalt catalyst (3.737 g) and methanol (200 mL) were charged to a one liter stainless steel autoclave. The reactor was sealed and purged with nitrogen then hydrogen. Ammonia (1.68 mole) was then charged to the reactor. The contents of the reactor were heated to 70° C. under 7 bar (100 psig) $H_2$. The pressure was increased to 55 bar (800 psig) and cyanoethyl ether (0.86 mole) was added to the reactor at 0.75 mL/minute. The reactor contents were analyzed by GC/FID and found to be 96.3% aminopropyl ether:

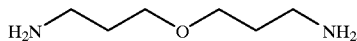

The product was purified by distillation at 60–63° C., 0.53 millibar (0.4 Torr).

The aminopropyl ether (0.38 mole), methyl isobutyl ketone (0.84 mole) and 5% Pd/C (4 wt % of total charge) were then charged to a one liter stainless steel autoclave. The reactor was sealed and purged with nitrogen then hydrogen. The contents of the reactor were heated to 90° C. under 7 bar (100 psig) $H_2$. The pressure was increased to 55 bar (800 psig) and maintained throughout the reaction (4 hours) by the admission of hydrogen from a 1 gallon ballast on demand by a dome regulator. The reactor contents were analyzed by GC/FID and found to be 93.7 area % of the dialkylated aminopropyl ether shown below. The product was purified by distillation at 130–134° C., 0.79 millibar (0.6 Torr).

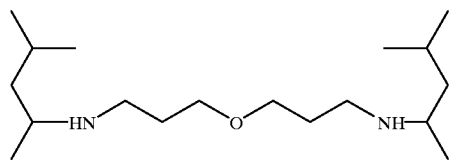

EXAMPLE 3

This example illustrates the procedure for the preparation of the reductive alkylation product of 1,2-(bis-3-aminopropoxy)ethane and methyl isobutyl ketone (BAPE/MIBK).

First, the required 1,2-(bis-3-aminopropoxy)ethane was prepared by hydrogenation of 1,2-bis-(2-cyanoethoxy) ethane. Nickel-chromium promoted sponge cobalt (3.78 g) and methanol (200 mL) were charged to a one liter stainless steel autoclave. The reactor was sealed and purged with nitrogen then hydrogen. Ammonia (1.82 mole) was then charged to the reactor. The contents of the reactor were heated to 70° C. under 7 bar (100 psig) $H_2$. The pressure was increased to 55 bar (800 psig) and 1,2-bis(2-cyanoethoxy) ethane (0.53 mole) was added to the reactor at 0.75 mL/minute. The reactor contents were analyzed by GC/FID and found to be 48.7% bis (3-amino-propoxy) ethane. The product was purified by distillation at 90–94° C., 0.53 millibar (0.4 Torr).

The (3-aminopropoxy)ethane (0.11 mole), methyl isobutyl ketone (0.24 mole) and 5% Pd/C (4 wt % of total charge) were charged to a one liter stainless steel autoclave. The reactor was sealed and purged with nitrogen then hydrogen. The contents of the reactor were heated to 90° C. under 7 bar (100 psig) $H_2$. The pressure was increased to 55 bar (800 psig) and maintained throughout the reaction (5.5 hours) by the admission of hydrogen from a 1 gallon ballast on demand by a dome regulator. The reactor contents were analyzed by GC/FID and found to be 91.5 area % dialkylated 1,2-bis-(3-aminopropoxy)ethane. The product was purified by distillation at 140–142° C., 0.53 millibar (0.4 Torr).

EXAMPLE 4

This example illustrates the procedure for the preparation of the reductive alkylation product of bis-3-(aminopropoxyethyl)ether and methyl isobutyl ketone (BAPEE/MIBK).

Bis-3-(aminopropoxyethyl)ether (0.5 mole), methyl isobutyl ketone (1.2 mole) and 5% Pd/C (3 wt % of total charge) were charged to a one liter stainless steel autoclave. The reactor was sealed and purged with nitrogen then hydrogen. The contents of the reactor were heated to 90° C. under 7 bar (100 psig) $H_2$. The pressure was increased to 55 bar (800 psig) and maintained throughout the reaction (5 hours) by the admission of hydrogen from a 1 gallon ballast on demand by a dome regulator. The reactor contents were analyzed by GC/FID and found to be 97.9 area % of the dialkylated bis-3-(amino-propoxyethyl) ether shown below. The product was purified by distillation at 160–164° C., 0.13 millibar (0.1Torr).

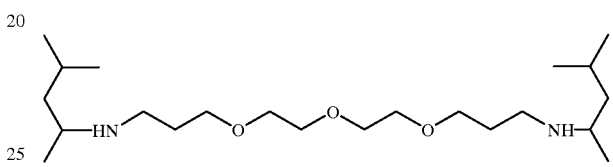

EXAMPLE 5

Dynamic surface tension data were obtained for aqueous solutions of the reductive alkylation product of the dialkylated aminoethylether of Example 1 using the maximum bubble pressure method at bubble rates from 0.1 bubbles/second (b/s) to 20 b/s. These data provide information about the performance of a surfactant at conditions from near-equilibrium (0.1 b/s) through extremely high surface creation rates (20 b/s). In practical terms, high bubble rates correspond to high printing speeds in lithographic printing, high spray or roller velocities in coating applications, and rapid application rates for agricultural products. The data are set forth in Table 1.

TABLE 1

| Dynamic Surface Tension (dyne/cm) - AEE/MIBK2 | | | | | |
|---|---|---|---|---|---|
| Concentration (wt %) | 0.1 b/s | 1 b/s | 6 b/s | 15 b/s | 20 b/s |
| 0.03 | 37.9 | 39.0 | 42.8 | 47.9 | 48.2 |
| 0.05 | 34.7 | 35.4 | 37.6 | 40.9 | 41.9 |
| 0.07 | 32.4 | 33.0 | 34.5 | 36.8 | 37.7 |
| 0.1 | 30.3 | 30.8 | 31.8 | 33.4 | 34.1 |
| 0.15 | 27.6 | 27.9 | 28.7 | 30.1 | 30.6 |
| 0.2 | 26.7 | 26.9 | 27.4 | 28.8 | 29.3 |

The results in Table 1 show that for a 0.1 wt % aqueous solution of AEE/MIBK2 of Example 1, the surface tension at 0.1 b/s is 30.3 dyne/cm. For the measurements performed at the high surface creation rate of 20 b/s, the surface tension of the aqueous solution of the AEE/MIBK2 was 34.1 dyne/cm. Such a marked ability to lower the surface tension of water under a variety of conditions is certainly of utility in water borne coatings, inks, adhesives, and agricultural formulations.

The solubility limit of the reductive alkylation product of AEE and MIBK is about 0.2 wt %. This means that if lower surface tension is required for a specific application, additional material may be added to the formulation; at a concentration of 0.2 wt %, the surface tension is 26.7 dyne/cm. Even at 20 b/s, the surface tension of a 0.2 wt % solution of AEE/MIBK is 29.3 dyne/cm. The enhanced performance at these high surface creation rates will provide superior productivity by enabling high printing speeds or application rates for water-based coating, ink, and agricultural formulations.

EXAMPLE 6

Aqueous solutions the dialkylated aminopropylether of Example 2 were prepared and their dynamic surface tension properties were measured using the procedure described above. The data are set forth in Table 2.

TABLE 2

Dynamic Surface Tension (dyne/cm) - APE/MIBK2

| Concentration (wt %) | 0.1 b/s | 1 b/s | 6 b/s | 15 b/s | 20 b/s |
| --- | --- | --- | --- | --- | --- |
| 0.1 | 30.8 | 31.3 | 32.6 | 34.4 | 34.9 |
| 0.15 | 29.3 | 29.9 | 30.1 | 32.9 | 33.3 |

These results in Table 2 show that the performance of a 0.1 wt % solution of APE/MIBK2 in water was outstanding. The ability to reduce the surface tension of water will be of great utility in waterborne coatings, inks, adhesives, and agricultural formulations.

EXAMPLE 7

Solutions in water of dialkylated 1,2-bis-(3-aminopropoxy)ethane (BAPE/MIBK2) of Example 3 were prepared and their dynamic surface tension properties were measured using the procedure described above. The data are set forth in Table 3.

TABLE 3

Dynamic Surface Tension (dyne/cm) - BAPE/MIBK2

| Concentration (wt %) | 0.1 b/s | 1 b/s | 6 b/s | 15 b/s | 20 b/s |
| --- | --- | --- | --- | --- | --- |
| 0.1 | 35.5 | 36.0 | 37.2 | 38.7 | 39.2 |
| 0.2 | 31.6 | 32.0 | 32.9 | 33.8 | 34.1 |
| 0.5 | 29.7 | 29.8 | 30.1 | 30.8 | 31.0 |

These results show that a solution of this material at a use level of 0.1 wt % provides surface tensions that will prove advantageous in a variety of waterborne applications. At the high surface creation rate of 20 b/s, the performance of a 0.1 wt % solution of BAPE/MIBK2 was 39.2 dyne/cm. Because BAPE/MIBK2 has a relatively high solubility, a performance regime can be accessed which is simply not attainable with surfactants of the prior art. Thus, BAPE/MIBK2 could be useful in coating, ink, and agricultural formulations which could be applied at fast rates.

EXAMPLE 8

Solutions in water of the reductive alkylation product of bis-(3-aminopropoxy-ethyl)ether and methyl isobutyl ketone (BAPEE/MIBK2) of Example 4 were prepared and their dynamic surface tension properties were measured using the procedure described above. The data are set forth in Table 4.

TABLE 4

Dynamic Surface Tension (dynes/cm) - BAPEE/MIBK2

| Concentration (wt %) | 0.1 b/s | 1 b/s | 6 b/s | 15 b/s | 20 b/s |
| --- | --- | --- | --- | --- | --- |
| 0.1 | 39.2 | 39.7 | 40.8 | 42.0 | 42.2 |
| 0.5 | 30.6 | 30.7 | 31.0 | 31.8 | 32.2 |

These data show that BABEE/MIBK2 effectively reduces the surface tension of water and that at a use level of 0.5 wt %, the performance of this material was remarkable.

EXAMPLE 9

The foaming properties of 0.1 wt % solutions of the reductive alkylation products of the products of this invention were examined using a procedure based upon ASTM D 1173-53. In this test, a 0.1 wt % solution of the surfactant is added from an elevated foam pipette to a foam receiver containing the same solution. The foam height is measured at the completion of the addition ("Initial Foam Height") and the time required for the foam to dissipate is recorded ("Time to 0 Foam"). This test provides a comparison between the foaming characteristics of various surfactant solutions. In general, in coatings, inks, and agricultural formulations, foam is undesirable because is complicates handling and can lead to coating and print defects, and to inefficient application of agricultural materials. The foam data are presented in Table 5.

TABLE 5

Foam Test Data

| Compound | Initial Foam Height (cm) | Time to 0 Foam |
| --- | --- | --- |
| APE/MIBK2 | 1.0 | 2 s |
| BAPE/MIBK2 | 2.6 | 8 s |
| BAPEE/MIBK2 | 3.1 | 5 s |

The data in Table 5 show that the compounds of this invention formed little foam and the foam which formed dissipated quickly. Thus it would be expected that these materials would have the requisite properties for use in coatings, inks and agricultural formulations.

The ability of a surfactant in aqueous systems to reduce surface tension under both equilibrium and dynamic conditions is of great importance in the performance of water-based coatings, inks, adhesives, and agricultural formulations. Low equilibrium surface tension allows the development of excellent properties subsequent to application. Low dynamic surface tension results in enhanced wetting and spreading under the dynamic conditions of application, resulting in more efficient use of the formulations and fewer defects. In waterborne coatings, inks, adhesives, and agricultural formulations, the formation of foam is generally undesirable because it complicates handling and can cause defects or result in inefficient application.

In addition, these materials are low-viscosity liquids, and are therefore easy to handle.

STATEMENT OF INDUSTRIAL APPLICATION

The invention provides material suitable for reducing the equilibrium and dynamic surface tension in water-based compositions.

We claim:

1. In a method for applying a water-based composition to a surface to partially or fully coat the surface, the composition containing an organic compound and an effective amount of a surfactant for reducing the dynamic surface tension of the composition, the improvement which comprises employing as the surfactant an alkylated aminoether of the structure

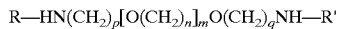

where n is 2–6, m is 0–4, and p and q are 2–6, and R and R' independently are an alkyl group of 5 to 18 carbons.

2. The method of claim 1 in which an aqueous solution of the alkylated aminoether demonstrates a dynamic surface tension of less than 45 dynes/cm at a concentration of $\leqq 5$ wt % in water at 23° C. and 1 bubble/second according to the maximum-bubble-pressure method.

3. The method of claim 2 in which n is 2–4, m is 0–2, and p and q are 2 or 3, and R and R' independently are an alkyl group of 5 to 8 carbons.

4. The method of claim 3 in which the alkyl group is branched or in which the point of attachment to nitrogen is on a nonterminal carbon.

5. The method of claim 1 in which the alkylated aminoether is the reductive alkylation product of aminoethylether and methyl isobutyl ketone.

6. The method of claim 1 in which the alkylated aminoether is the reductive alkylation product of aminopropylether and methyl isobutyl ketone.

7. The method of claim 1 in which the alkylated aminoether is the reductive alkylation product of 1,2-(bis-3-aminopropoxy)ethane and methyl isobutyl ketone.

8. The method of claim 1 in which the alkylated aminoether is the reductive alkylation product of bis-3-(aminopropoxyethyl)ether and methyl isobutyl ketone.

9. The method of claim 2 in which the measurement is made at 20 bubbles/second.

* * * * *